United States Patent
Li et al.

(10) Patent No.: US 7,595,615 B2
(45) Date of Patent: Sep. 29, 2009

(54) SYSTEMS AND METHODS FOR PROVIDING OVER-CURRENT PROTECTION IN A SWITCHING POWER SUPPLY

(75) Inventors: Qiong M. Li, Allen, TX (US); Michael Joseph Tsecouras, Carrollton, TX (US); Dale James Skelton, Plano, TX (US); James Teng, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 398 days.

(21) Appl. No.: 11/396,859

(22) Filed: Mar. 31, 2006

(65) Prior Publication Data

US 2006/0221528 A1 Oct. 5, 2006

Related U.S. Application Data

(60) Provisional application No. 60/668,388, filed on Apr. 5, 2005.

(51) Int. Cl.
G06F 1/573 (2006.01)
(52) U.S. Cl. .................. 323/277; 323/284; 323/908
(58) Field of Classification Search .......... 323/222, 323/225, 276, 277, 284, 351, 901, 908; 361/87, 361/93.1, 93
See application file for complete search history.

(56) References Cited

U.S. PATENT DOCUMENTS 6,405,000 B1 * 6/2002 Nakaya .................. 399/67
6,441,679 B1 * 8/2002 Ohshima ................ 323/282
7,339,773 B2 * 3/2008 Gergintschew .......... 361/93.1
2008/0225456 A1 * 9/2008 Daio et al. .............. 361/98

* cited by examiner

Primary Examiner—Jessica Han
(74) Attorney, Agent, or Firm—John J. Patti; Wade J. Brady, III; Frederick J. Telecky, Jr.

(57) ABSTRACT

A system and method is provided for providing integrated over-current protection in a switching power supply. In one embodiment, a switching power supply could comprise a gate drive circuit operative to receive a pulse-width modulated (PWM) signal and to drive at least one power field effect transistor (FET) between alternating activated and deactivated states based on a pulse-width of the PWM signal. The switching power supply could also comprise a current sense circuit operative to measure a current associated with the at least one power FET during the activated state. The switching power supply could also comprise a first over-current protection circuit providing a first adjustment to the PWM signal in response to the current being substantially between a first threshold and a second threshold. The second threshold could be greater than the first threshold. The switching power supply could further comprise a second over-current protection circuit providing a second adjustment to the PWM signal in response to the current being substantially greater than the second threshold.

20 Claims, 4 Drawing Sheets

SYSTEMS AND METHODS FOR PROVIDING OVER-CURRENT PROTECTION IN A SWITCHING POWER SUPPLY

CROSS REFERENCE TO RELATED APPLICATIONS

This application claims the benefit of provisional patent application No. 60/668,388, which was filed on Apr. 5, 2005, and entitled INTEGRATED OC PROTECTION FOR SHORT CIRCUIT AND MINIMUM PULSE CONDITIONS IN A POWER DEVICE. This provisional patent application is incorporated herein by reference.

TECHNICAL FIELD

This invention relates to electronic circuits, and more specifically to systems and methods for providing over-current protection in a switching power supply.

BACKGROUND

There is an ever increasing demand for power conversion and regulation circuitry to operate with increased efficiency. One such type of regulator circuit is known as a switching regulator or switching power supply. A switching power supply controls the flow of power to a load by controlling the "on" and "off" duty-cycle of one or more transistor switches coupled to the load. One such way of controlling the "on" and "off" duty-cycle of the one or more transistor switches is to generate a pulse-width-modulated (PWM) signal, such that the "on" and "off" duty-cycle of the one or more transistor switches is determined by relative pulse-widths of the PWM signal. Switching power supplies have been implemented as an efficient mechanism for providing a regulated output. Many different classes of switching power supplies exist today.

To achieve a regulated output, a switching power supply often generates a current that is switched between a positive supply voltage and ground, such that the generated current is applied to a load. Switching power supplies often include over-current sensing and protection schemes to prevent the switching power supply from being damaged as a result of an over-current condition. Since resistive loads generate power loss in the form of heat, one manner of providing increased efficiency in a switching power supply is to use transistor switches that have a low activation resistance ($R_{DSon}$). However, transistor switches with a low $R_{DSon}$ value may generate current too quickly as the low $R_{DSon}$ value substantially creates a short circuit to the positive supply voltage or to ground. As such, typical over-current sensing and protection schemes may not be sufficient to limit the current flow quickly or effectively enough to prevent damage to the switching power supply. In addition, as switching power supplies become more efficient, the on duty-cycle of transistor switches can typically be very small. As there is often a delay associated with current sensing, it may be difficult to measure current flow through a switching transistor that is only activated for a very short period of time. Accordingly, a current sense hole could exist, such that an indeterminable over-current condition could exist in the switching power supply.

SUMMARY

In one embodiment of the present invention, a switching power supply could comprise a gate drive circuit operative to receive a pulse-width modulated (PWM) signal and to drive at least one power field effect transistor (FET) between alternating activated and deactivated states based on a pulse-width of the PWM signal. The switching power supply could also comprise a current sense circuit operative to measure a current associated with the at least one power FET during the activated state. The switching power supply could also comprise a first over-current protection circuit providing a first adjustment to the PWM signal in response to the current being substantially between a first threshold and a second threshold. The second threshold could be greater than the first threshold. The switching power supply could further comprise a second over-current protection circuit providing a second adjustment to the PWM signal in response to the current being substantially greater than the second threshold.

Another embodiment of the present invention includes a method for providing over-current protection in a switching power supply. The method could comprise driving at least one power field effect transistor (FET) in alternating activated and deactivated states based on a pulse-width associated with a pulse-width modulated (PWM) signal, and measuring a current associated with the at least one power FET. The method could also comprise detecting if the measured current satisfies an over-current condition based on a first threshold and a second threshold. The second threshold could be greater than the first threshold. The method could also comprise narrowing the pulse-width associated with the PWM signal on a cycle-by-cycle basis if the measured current is substantially between the first threshold and the second threshold. The method could further comprise skipping N pulses of the PWM signal if the measured current is greater than the second threshold, where N is a positive integer greater than or equal to 1.

In another embodiment of the present invention, a switching power supply could comprise means for providing a pulse-width modulated (PWM) signal to drive at least one power field effect transistor (FET) between alternating activated and deactivated states based on a pulse-width associated with the PWM signal. The switching power supply could also comprise means for determining the presence of a current sense hole associated with a current. The current could be associated with the at least one power FET in the activated state. The switching power supply could also comprise means for adjusting the PWM signal to allow the current associated with the at least one power FET to be measured and means for measuring the current associated with the at least one power FET in the activated state. The switching power supply could also comprise means for detecting an over-current condition based on the measured current being greater than a current threshold, and means for reducing a current associated with the switching power supply in response to the over-current condition.

DETAILED DESCRIPTION

The present invention relates to electronic circuits, and more specifically to a systems and methods for providing over-current protection in a switching power supply. The system could include at least one power field effect transistor (FET) that is driven by a pulse-width modulated (PWM) signal. The system could measure a current flow associated with the at least one power FET. The measurement could be a current flow through a power FET interconnecting a switching node and a positive supply voltage. If the measured current is above a first over-current threshold value, the system could apply a first level of over-current protection. The first level of over-current protection could include a cycle-by-cycle narrowing of a pulse-width of the PWM signal, for example, by deactivating the pulse early during the current cycle or by narrowing subsequent pulses. If the measured current is above a second over-current threshold value, with the second over-current threshold value being greater than the first over-current threshold value, the system could apply a second level of over-current protection. The second level of over-current protection could include skipping at least one pulse of the PWM signal. The system could shut-off based on a threshold condition associated with the first level of over-current protection and/or the second level of over-current protection. For example, the threshold condition could include expiration of a timer or accumulation of a counter to a specific value associated with a repetitive over-current condition. In addition, the system could detect the presence of a current sense hole. A current sense hole is defined herein as a condition upon which a pulse-width of the PWM signal is insufficient for measuring the current associated with the at least one power FET. The system could, upon detecting a current sense hole condition, further adjust the PWM signal to allow an over-current condition to be detected despite the current sense hole.

Figure 1:
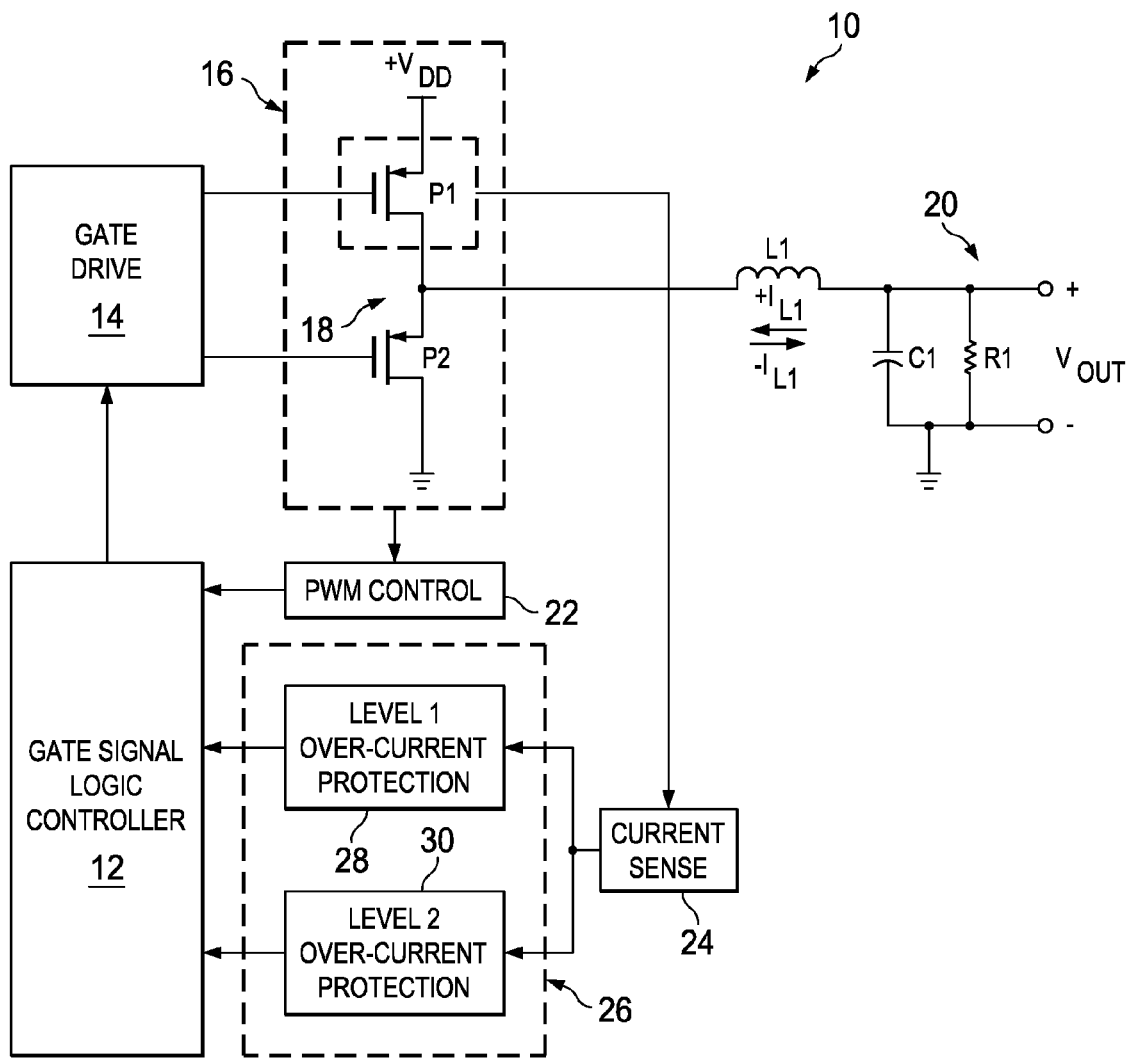
FIG. 1 illustrates an example of a switching power supply in accordance with an aspect of the invention.

FIG. 1 demonstrates an example of a switching power supply 10 in accordance with an aspect of the invention. As an example, the switching power supply 10 could be, or could be part of, a class-D power supply. The switching power supply 10 includes a gate signal logic controller 12. The gate signal logic controller 12 provides a pulse-width modulated (PWM) signal PWM_GD to a gate drive circuit 14. The signal PWM_GD typically operates by having a logic 1 pulse at substantially every period, the logic 1 pulse having a variable pulse-width. The gate drive circuit 14 receives the signal PWM_GD and provides inputs to a half-bridge regulator circuit 16.

The half bridge regulator circuit 16 includes a first P-type power FET P1 and a second P-type power FET P2. The first power FET P1 is interconnected between a positive supply voltage $V_{DD}$ and a switching node 18. The second power FET P2 is interconnected between the switching node 18 and a negative supply voltage, illustrated as ground in the example of FIG. 1. It is to be understood that the example of FIG. 1 is not intended to be limited by the use of the half-bridge regulator circuit 16, but that any of a variety of arrangements of power FETs can be utilized in accordance with an aspect of the invention. For example, the switching power supply 10 could instead include a full bridge regulator, a three-phase circuit, a digital amplifier, or a synchronous or asynchronous DC-DC converter. In addition, it is also to be understood that the half-bridge regulator circuit 16 in the example of FIG. 1 is not limited to the use of P-type FETs, but that N-type FETs could be included.

The gate drive circuit 14 can provide alternating inputs to the first power FET P1 and the second power FET P2 such that each of the first power FET P1 and the second power FET P2 alternate between an activated state (i.e., "on" state) and a deactivated state (i.e., "off" state). For example, the gate drive circuit 14 could provide a pulsed input to the first power FET P1 and a complemented pulsed input to the second power FET P2, such that only one of the first power FET P1 and the second power FET P2 could be in the activated state at a given time. The gate drive circuit 14 could instead provide a gap band between the pulsed inputs, such that, upon deactivation of one of the first power FET P1 and the second power FET P2, there is a period of time in which neither of the first power FET P1 and the second power FET P2 is activated. It is to be understood that the gate drive circuit 14 could also provide the appropriate level-shifting to properly bias the first power FET P1 and the second power FET P2 relative to respective drain and source voltages. By alternating the inputs to the first power FET P1 and the second power FET P2, the switching node 18 becomes alternately coupled between the positive supply voltage $V_{DD}$ and ground, thus maintaining a voltage at the switching node 18. The voltage at the switching node 18 induces a current through an inductor L1. The inductor L1 conducts an inductor current $I_{L1}$, between the switching node 18 and an output node 20 of the switching power supply 10. The output node 20 has an output voltage $V_{OUT}$ and is coupled to ground via a parallel interconnecting capacitor C1 and resistor R1. Accordingly, the output voltage $V_{OUT}$, in the example of FIG. 1, is with reference to ground.

It is to be understood that, in the example of FIG. 1 and as will be better demonstrated below, the inductor current $I_{L1}$ can flow in a positive direction, indicated by the arrow labeled $+I_{L1}$, and can flow in a negative direction, indicated by the arrow labeled $-I_{L1}$. The direction of current flow is dependent on the output voltage $V_{OUT}$ relative to the voltage at the switching node 18. For example, in a steady state condition, the output voltage $V_{OUT}$ can be greater than the voltage at the switching node 18, such that the inductor current $I_{L1}$ is positive. However, as the output voltage $V_{OUT}$ increases to the steady state, or if the output node 20 is shorted to ground or to the positive supply voltage $V_{DD}$, then the inductor current $I_{L1}$ is negative.

The switching power supply 10 includes a PWM control circuit 22. The PWM control circuit 22 could be, for example, a differential comparator. The PWM control circuit 22 is coupled to the half-bridge regulator circuit 16 and provides feedback to the gate signal logic controller 12. Accordingly, the gate signal logic controller 12 can adjust the signal PWM_GD to account for variations in the output voltage $V_{OUT}$, such that a regulated and steady state DC output voltage $V_{OUT}$ can be provided by the switching power supply 10. It is to be understood that the PWM control circuit 22 can provide the feedback in any of a variety of different ways. For example, the PWM control circuit 22 could sense a quantity of the output voltage $V_{OUT}$ and compare the output voltage $V_{OUT}$ to a reference voltage.

The switching power supply 10 also includes a current sense circuit 24. In the example of FIG. 1, the current sense circuit 24 measures a current associated with the power FET P1. It is to be understood that the current sense circuit 24 can measure the current associated with the power FET P1 in any of a variety of ways. For example, the current could be measured via a current sense resistor or via a voltage comparator. In addition, as will be described in greater detail below, the current sense circuit 24 could also measure the current associated with the second power FET P2. The current associated with the power FET P1 is a current that flows between the drain terminal to the source terminal of the power FET P1 while the power FET P1 is in the activated state. Furthermore, the measurement of the current flowing through the first power FET P1 during the activated state could occur every time the first power FET P1 is activated, such that the measurement could occur in response to every pulse of the signal PWM_GD.

The current sense circuit 24 provides the measured current to an over-current protection circuit 26. The over-current protection circuit 26 includes a level 1 over-current protection circuit 28 and a level 2 over-current protection circuit 30. Each of the level 1 over-current protection circuit 28 and the level 2 over-current protection circuit 30 operate to detect an over-current condition based on the measured current and to provide a control signal to the gate signal logic controller 12 to reduce the amount of the current $I_{L1}$ that flows through the inductor L1. For example, the over-current protection circuit 26 could receive the measured current, decide which of the two levels of over-current protection to apply based on the amount of the measured current relative to predetermined over-current thresholds, and apply the given level of over-current protection. Accordingly, the level 1 over-current device 28 and the level 2 over-current device 30 may operate mutually exclusively of each other. For example, a first predetermined over-current threshold and a second predetermined over-current threshold can be established. The first predetermined over-current threshold can correspond to a current that is indicative of an overload condition of the switching power supply, and the second predetermined over-current threshold can correspond to a current that is indicative of a short circuit condition between the output node 20 and either the positive supply voltage $V_{DD}$ or ground. Accordingly, in this example, the second predetermined over-current threshold is greater than the first predetermined over-current threshold. It is to be understood that the predetermined thresholds can be programmed to be any desired values.

The level 1 over-current protection circuit 28 may operate to reduce the current $I_{L1}$ if the measured current is substantially between the first predetermined over-current threshold and the second predetermined over-current threshold. For example, the level 1 over-current protection circuit 28 may, upon detecting that the measured current is substantially between the first predetermined over-current threshold and the second predetermined over-current threshold, send a control signal to the gate signal logic controller 12. The gate signal logic controller 12, in response to the level 1 over-current protection circuit 28 control signal, could, for example, begin narrowing the pulses of the signal PWM_GD on a cycle-by-cycle basis. As another example, the gate signal logic controller 12 could deactivate the current pulse early. Therefore, the first power FET P1 becomes activated for less time based on the narrow pulses, thus reducing the current of the switching power supply 10.

The level 2 over-current protection circuit 30 may operate to reduce the current $I_{L1}$ if the measured current is greater than the second predetermined over-current threshold. For example, the level 2 over-current protection circuit 30 may, upon detecting that the measured current is greater than the second predetermined over-current threshold, send a control signal to the gate signal logic controller 12. The gate signal logic controller 12, in response to the level 2 over-current protection circuit 30 control signal, could begin skipping pulses of the signal PWM_GD. Therefore, the inductor L1 begins discharging the inductor current $I_{L1}$ flowing through it, thus reducing the current of the switching power supply 10. The number of pulses skipped could be preprogrammed, or it could be evaluated every period of the signal PWM_GD whether to skip another pulse.

Figure 2:
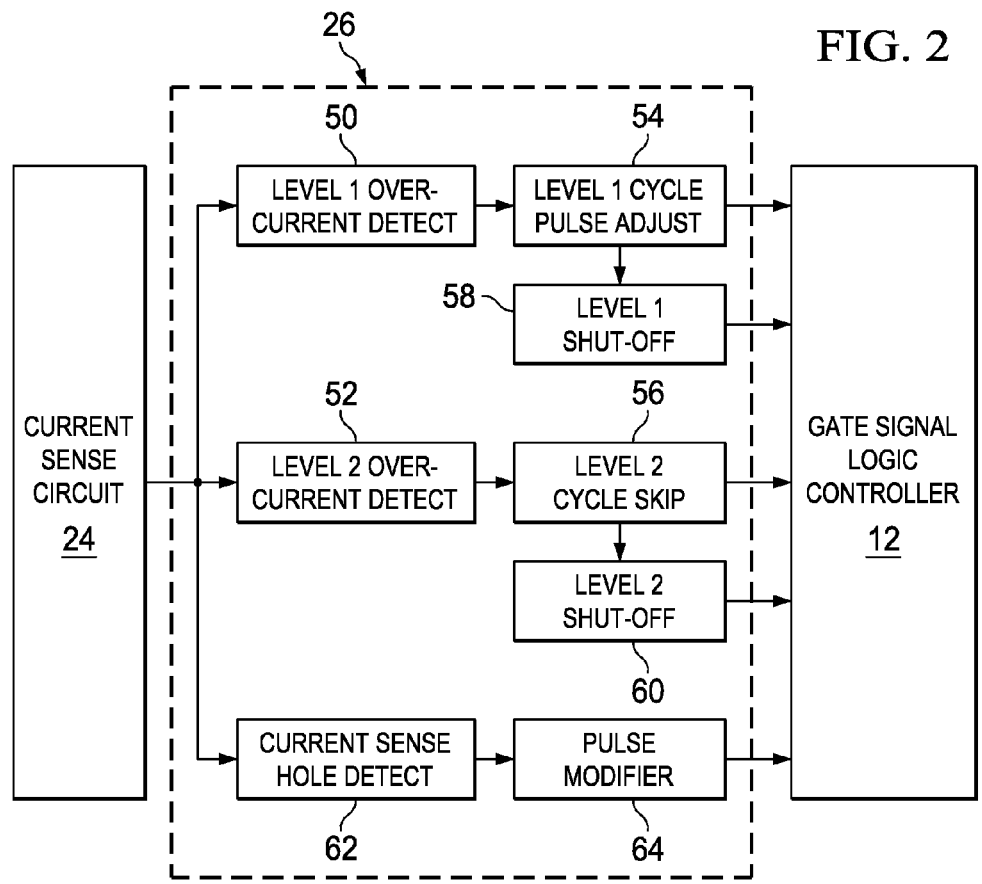
FIG. 2 illustrates an example of an over-current protection circuit in accordance with an aspect of the invention.

FIG. 2 illustrates an example of the over-current protection circuit 26 in accordance with an aspect of the invention. It is to be understood that like reference numbers and reference will be made to the above described example of FIG. 1 in the discussion of FIG. 2. The over-current protection circuit 26 receives a measured current value from a current sense circuit 24. The measured current is received by a level 1 over-current detector 50 and a level 2 over-current detector 52. The level 1 over-current detector 50 is coupled to a level 1 cycle pulse adjust circuit 54 and the level 2 over-current detector 52 is coupled to a level 2 cycle skip circuit 56.

If the level 1 over-current detector 50 determines that the measured current is between a first predetermined over-current threshold and a second predetermined over-current threshold, then the level 1 over-current detector 50 activates the level 1 cycle pulse adjust circuit 54. The level 1 cycle pulse adjust circuit 54 then communicates with the gate signal logic controller 12. The gate signal logic controller 12 could thus begin narrowing pulses or deactivating pulses early on the signal PWM_GD (not shown) that is used to control the switching power supply 10. Thus, current is reduced in the switching power supply 10. Likewise, if the level 2 over-current detector 52 determines that the measured current is greater than the second predetermined over-current threshold, then the level 2 over-current detector 52 activates the level 2 cycle skip circuit 56. The level 2 cycle skip circuit communicates with the gate signal logic controller 12 to enable gate signal logic controller 12 to skip N pulses in the signal PWM_GD, where N is a positive integer greater than or equal to 1. Therefore, the current $I_{L1}$ is reduced in the switching power supply 10.

The level 1 cycle pulse adjust circuit 54 is coupled to a level 1 shut-off circuit 58. The level 1 shut-off circuit 58 monitors the activity of the level 1 cycle pulse adjust circuit 54 and issues a shut-off command to the gate signal logic controller 12 upon the occurrence of a level 1 predetermined threshold condition. For example, the level 1 shut-off circuit 58 could include a timer that increments while the level 1 cycle pulse adjust circuit 54 commands the gate signal logic controller 12 to narrow the pulses of the signal PWM_GD. Upon the timer reaching a predetermined time, the level 1 shut-off circuit 58 could issue the shut-off command. Additionally or alternatively, the level 1 shut-off circuit 58 could increment a counter for every period, and thus every narrowed pulse, of the signal PWM_GD, such that the predetermined threshold condition is a specific number of counts. The level 1 predetermined threshold condition could be reset, for example, upon the measured current being less than the first predetermined over-current threshold. The predetermined threshold condition of the level 1 shut-off circuit 58 could be set such that a shut-off issuance is indicative of a problem that extends beyond normal operation of the switching power supply 10. For example, the switching power supply 10 could have a load attached that is too large for the switching power supply 10 to be able to operate safely or effectively. Therefore, the shut-off command can be such that the entire switching power supply 10 shuts-down to prevent damage to the switching power supply 10, allowing a user to troubleshoot the problem.

The level 2 cycle skip circuit 56 is coupled to a level 2 shut-off circuit 60. The level 2 shut-off circuit 60 monitors the activity of the level 2 cycle skip circuit 56 and issues a shut-off command to the gate signal logic controller 12 upon the occurrence of a level 2 predetermined threshold condition. For example, the level 2 shut-off circuit 60 could include a timer that increments while the level 2 cycle skip circuit 56 commands the gate signal logic controller 12 to skip the pulses of the signal PWM_GD. Upon the timer reaching a predetermined time, the level 2 shut-off circuit 60 could issue the shut-off command. Additionally or alternatively, the level 2 shut-off circuit 60 could increment a counter for every period, and thus every skipped pulse, of the signal PWM_GD, such that the predetermined threshold condition is a specific number of counts. The level 2 predetermined threshold condition could be reset, for example, upon the measured current being less than either the first predetermined over-current threshold or the second predetermined over-current threshold. The predetermined threshold condition of the level 2 shut-off circuit 60 could be set such that a shut-off issuance is indicative of a problem that extends beyond normal operation of the switching power supply 10. For example, the switching power supply 10 could have an internal short-circuit between the output node and either the positive supply voltage or the negative supply voltage, such as ground. Therefore, the shut-off command can be such that the entire switching power supply 10 shuts-down to prevent damage to the switching power supply 10, allowing a user to troubleshoot the problem.

It is to be understood that the operation of the level 1 shut-off circuit 58 and the level 2 shut-off circuit 60 can be independent of each other. For example, one of the level 1 shut-off circuit 58 and the level 2 shut-off circuit 60 can be set for a timed predetermined threshold condition while the other is set for a counting predetermined threshold condition. Also, the predetermined threshold conditions can be cumulative or can be reset upon the switching power supply 10 no longer experiencing an over-current condition. In addition, the predetermined threshold conditions need not be limited to timing and counting, but that any of a variety of ways of monitoring the over-current condition and compensation can be implemented. Furthermore, the over-current protection circuit 26 may not include both the level 1 shut-off circuit 58 and the level 2 shut-off circuit 60, but instead could include only one or neither, as dictated by the application or the circuit design requirements.

As described above with regard to FIG. 1, the current sense circuit 24 measures current flow through the first power FET P1 while the first power FET P1 is in the activated state. As the pulse-width of the signal PWM_GD becomes narrower, the pulses of the signal PWM_GD may approach a minimum pulse-width. The minimum pulse-width may be dictated by propagation delays associated with the power FETs in the switching power supply 10. However, the minimum pulse-width may be less than a delay associated with the current sense circuit 24, such that the current sense circuit 24 is unable to measure current flow through the first power FET P1 because the first power FET P1 may not be activated for a long enough time to compensate for the delay associated with the current sense circuit 24. Accordingly, such a condition is defined herein as a current sense hole. A current sense hole can be a detrimental condition for the switching power supply 10, as the switching power supply 10 may experience an over-current condition without being able to detect it.

To compensate for the presence of current sense holes, the over-current protection circuit 26 includes a current sense hole detect circuit 62. The current sense hole detect circuit 62 is able to detect the presence of a current sense hole based on information received from the current sense circuit 24. The current sense hole detect circuit 62, upon detecting a current sense hole, communicates with a pulse modifier circuit 64. The pulse modifier circuit 64 transmits a control signal to the gate signal logic controller 12, such that the gate signal logic controller 12 can widen the pulse-width of the signal PWM_GD to a width that is substantially equal to or greater than the delay associated with the current sense circuit 24. Therefore, the current sense circuit 24 can measure the current associated with the first power FET P1 because the first power FET P1 will be in the activated state for a sufficient amount of time.

Figure 3:
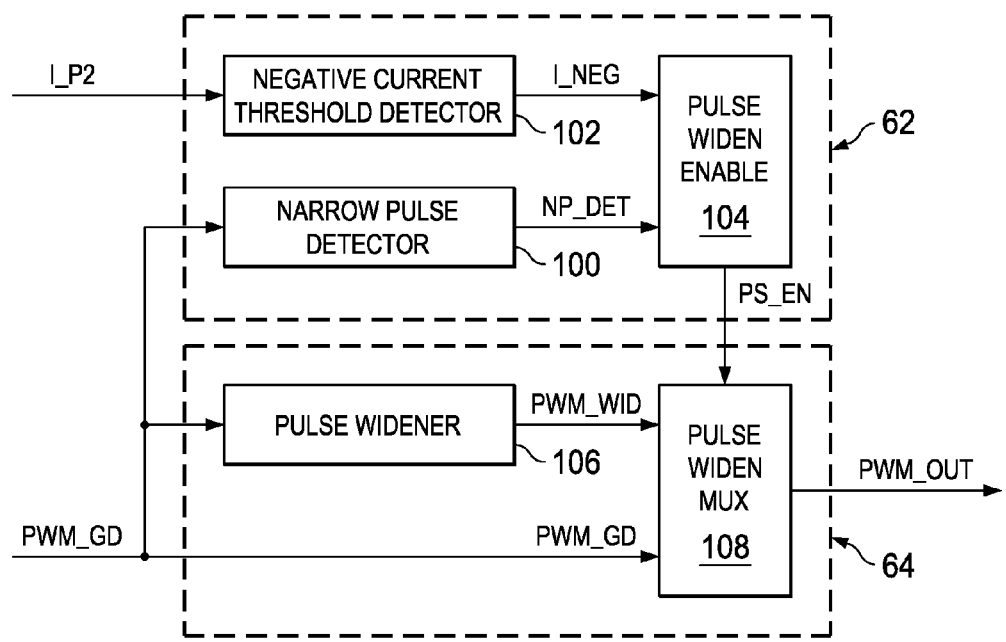
FIG. 3 illustrates an example of a current sense hole detection and pulse widener circuit in accordance with an aspect of the invention.

The operation of the current sense hole detect circuit 62 and the pulse modifier circuit 64 can be better described with reference to FIGS. 3 and 4. FIG. 3 illustrates an example of the current sense hole detect circuit 62 and the pulse modifier circuit 64 in accordance with an aspect of the invention. It is to be understood that reference will be made to FIGS. 1 and 2 in the discussion of FIGS. 3 and 4, and as such, like reference numbers will be used. The current sense hole detect circuit 62 includes a narrow pulse detector 100, a negative current threshold detector 102, and a pulse widen enable 104. The narrow pulse detector 100 receives the signal PWM_GD as an input and measures the pulse-width. If the narrow pulse detector 100 determines that the signal PWM_GD is narrower in time than the delay associated with the current sense circuit 24, the narrow pulse detector 100 asserts a signal NP_DET.

As described above with reference to FIG. 1, the current sense circuit 24 may also measure a current flow associated with the second power FET P2. As also described above regarding FIG. 1, the activation of the first power FET P1 and the second power FET P2 are substantially complementary. Accordingly, in the event of a current sense hole condition, although the current flow through the first power FET P1 may not be measurable, a current flow I_P2 flowing through the second power FET P2 may be measurable. This is because, during a current sense hole condition, the first power FET P1 is activated for an amount of time that is relatively smaller than the amount of time that it is deactivated. Therefore, because of the substantially complementary activation and deactivation of the first power FET P1 and the second power FET P2, the second power FET P2 is activated for substantially the same amount of time that the first power FET P1 is deactivated, which may be an amount of time that is sufficient to overcome the delay associated with the current sense circuit 24.

The current sense circuit 24 transmits the current I_P2 of the second power FET P2 to the negative current threshold detector 102. The negative current threshold detector 102 detects whether the current I_P2 is negative relative to a steady state operation of the switching power supply 10, such that the inductor current $I_{L1}$ is negative. It is to be understood that the current I_P2, when negative relative to steady state operation, may not actually flow through the second power FET P2, but could instead flow through a parallel connected diode or similar device configuration. Accordingly, the negative current threshold detector 102 merely detects when the current I_P2 flows from ground to the switching node 18, such that it flows opposite from steady state. In addition, the negative current threshold detector 102 may also detect if the negative current is greater than a specific predetermined negative current threshold. For example, the current I_P2 may be momentarily negative as a result of noise or regulation of the output voltage $V_{OUT}$. However, upon reaching a specific predetermined negative current threshold, the current I_P2 may be more indicative of an actual over-current condition. The negative current threshold detector 102 asserts a signal I_NEG upon determining that the current I_P2 meets a negative current threshold relative to steady state operation of the switching power supply 10.

The pulse modifier circuit 64 includes a pulse widener 106 and a pulse widen multiplexer 108. The pulse modifier circuit 64 receives the signal PWM_GD as an input, which is input specifically to the pulse widener 106 and the pulse stretch multiplexer 108. The pulse widener 106 outputs a signal PWM_WID, which is a PWM signal having a pulse-width that is substantially greater than or equal to the delay associated with the current sense circuit 24. The pulse widener 106 may generate the signal PWM_WID in any of a number of ways. For example, the pulse widener 106 may determine the difference between the pulse-width of the signal PWM_GD and the current sense circuit 24 delay, and thus adds a pulse-width to the signal PWM_GD that is approximately equal to the calculated difference. As another example, the pulse widener 106 may simply add a fixed amount of pulse-width, such that the fixed amount of pulse-width is always sufficient to overcome the delay associated with the current sense circuit 24. The pulse widener 106 could simply generate a fixed pulse-width signal PWM_WID that is independent of the signal PWM_GD, such that it may not receive it as an input. In any event, the signal PWM_WID has a pulse-width that is substantially greater than or equal to the delay associated with the current sense circuit 24. The signal PWM_WID and the signal PWM_GD are each input to the pulse widen multiplexer 108.

The pulse widen enable 104 receives each of the signals I_NEG and NP_DET as inputs. As described above, a current sense hole condition occurs when the current sense circuit 24 is unable to measure current flow through the first power FET P1 because the first power FET P1 may not be activated for long enough to compensate for the delay associated with the current sense circuit 24. However, the current sense hole detect circuit 62 may not need to detect the presence of a current sense hole if the switching power supply 10 is operating in the steady state. Accordingly, a current sense hole condition is detected if the pulse-width of the signal PWM_GD is narrower than the current sense circuit 24 delay and the current I_P2 exceeds a negative current threshold, and is thus not at steady state. Therefore, if each of the signals I_NEG and NP_DET are asserted (i.e., logic high), then a current sense hole condition is detected, and the pulse widen enable 104 asserts an output signal PS_EN to the pulse widen multiplexer 108. The signal PS_EN can simply act as a selector signal for the pulse widen multiplexer 108. It is to be understood that the pulse widen enable 104 could be an AND-gate, or could be a latch or flip-flop depending on timing and/or enable signals as dictated by design choice.

The signal PS_EN is used to select between the two signals PWM_WID and PWM_GD that are input to the pulse widen multiplexer 108. The selected one of the two signals PWM_WID and PWM_GD is output from the pulse widen multiplexer 108 as a signal PWM_OUT. For example, if the signal PS_EN is logic high, thus indicating the presence of a current sense hole condition, the pulse widen multiplexer 108 outputs the signal PWM_WID as the signal PWM_OUT. If the signal PS_EN is logic low, then there is no current sense hole condition, and the pulse widen multiplexer 108 outputs the signal PWM_GD as the signal PWM_OUT. The signal PWM_OUT is input to the gate signal logic controller 12 to control the pulse-width of the signal PWM_GD output from the gate signal logic controller 12. For example, the gate signal logic controller 12 could simply output the signal PWM_OUT as the signal PWM_GD to the gate drive circuit 14. Therefore, it is to be understood that the pulse modifier circuit 64 may not be a separate device from the gate signal logic controller 12, as demonstrated in the examples of FIGS. 2 and 3, but could be integral to it. In any case, the pulse widened signal PWM_GD thus now has a sufficiently wide pulse-width to be measured by the current sense circuit 24 to determine whether or not an over-current condition exists.

Figure 4:
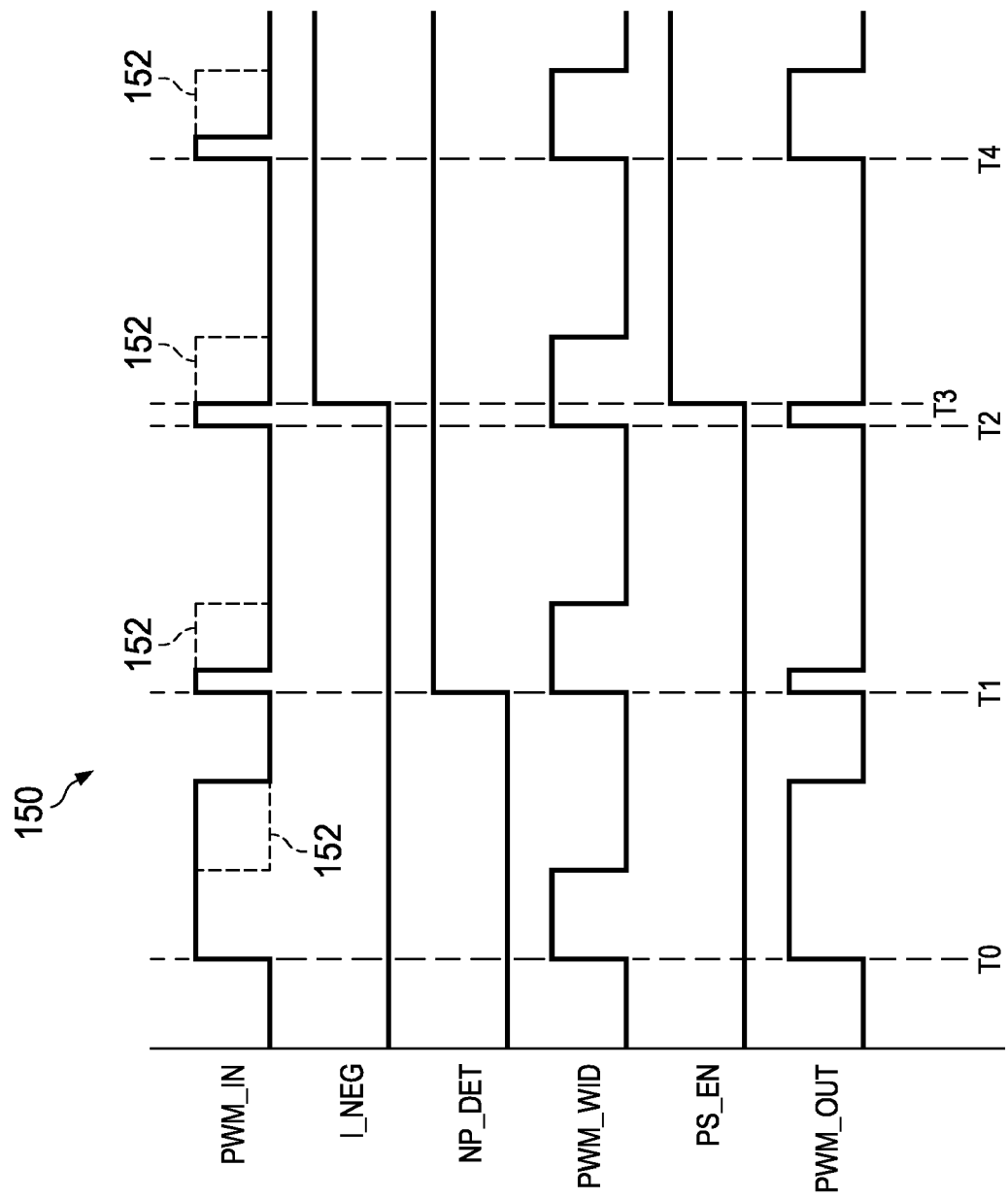
FIG. 4 illustrates an example of a timing diagram associated with the example of FIG. 3 in accordance with an aspect of the invention.

FIG. 4 illustrates an example of a timing diagram 150 associated with the example of FIG. 3 in accordance with an aspect of the invention. It is to be understood that the timing diagram 150 is demonstrated in the example of FIG. 4 as an ideal timing diagram, such that there are no demonstrated time and/or switching delays. At a time T0, the signal PWM_GD begins a pulse. A pulse length that is substantially equal to the delay associated with the current sense circuit 24 is demonstrated as a dashed line 152 accompanying each pulse of the signal PWM_GD. The signal PWM_WID also begins a pulse at the time T0, and at every other time that the signal PWM_GD is asserted. Each of the pulses of the signal PWM_WID, as demonstrated in the example of FIG. 4, have a pulse-width that is substantially equal to the delay associated with the current sense circuit 24. The pulse of the signal PWM_GD beginning at the time T0 has a pulse-width that is greater than the current sense circuit 24 delay. Thus, a current sense hole condition is not present. Because there is no current sense hole condition, the signal PS_EN is not asserted. Therefore, the pulse widen multiplexer 108 outputs the signal PWM_OUT at the time T0 having a pulse-width substantially equal to the signal PWM_GD.

At a time T1, the signal PWM_GD begins another pulse. The pulse length of the pulse beginning at the time T1, however, is less than the delay associated with the current sense circuit 24. Therefore, the narrow pulse detector 100 asserts a logic high NP_DET signal to signify that the pulse beginning at the time T1 is less than the current sense circuit 24 delay. However, at the time T1, the switching power supply 10 is operating in a steady state because the signal I_NEG output from the negative current threshold detector 102 is not asserted. Thus, the signal PS_EN is also not asserted, indicating that a current sense hole condition is not present. Therefore, the pulse widen multiplexer 108 outputs the signal PWM_OUT at the time T1 having a pulse-width that is substantially equal to the signal PWM_GD. Similarly, at a time T2, because the signal PS_EN is likewise not asserted, the pulse widen multiplexer 108 outputs the signal PWM_OUT at the time T2 having a pulse-width that is substantially equal to the signal PWM_GD.

At a time T3, illustrated in the example of FIG. 4 as a falling edge of the pulse beginning at the time T2, the switching power supply 10 no longer operates in a steady state. Therefore, the negative current threshold detector 102 detects that the current I_P2 exceeds a negative current threshold and asserts the signal I_NEG logic high. Accordingly, also at the time T3, the signal PS_EN becomes asserted because both the signal I_NEG and the signal NP_DET are both logic high. At a time T4, the signal PWM_GD begins another pulse. However, at the time T4, the switching power supply 10 is not operating in a steady state and the pulse length of the signal PWM_GD at the time T4 is less than the delay associated with the current sense circuit 24. Thus, the signal PS_EN is asserted to indicate that a current sense hole condition is present. Accordingly, the pulse widen multiplexer 108 outputs the signal PWM_OUT at the time T4 having a pulse-width that is substantially equal to the signal PWM_WID. Therefore, the pulse widened signal PWM_GD now has a sufficiently wide pulse-width to be measured by the current sense circuit 24 to determine whether or not an over-current condition exists.

Figure 5:
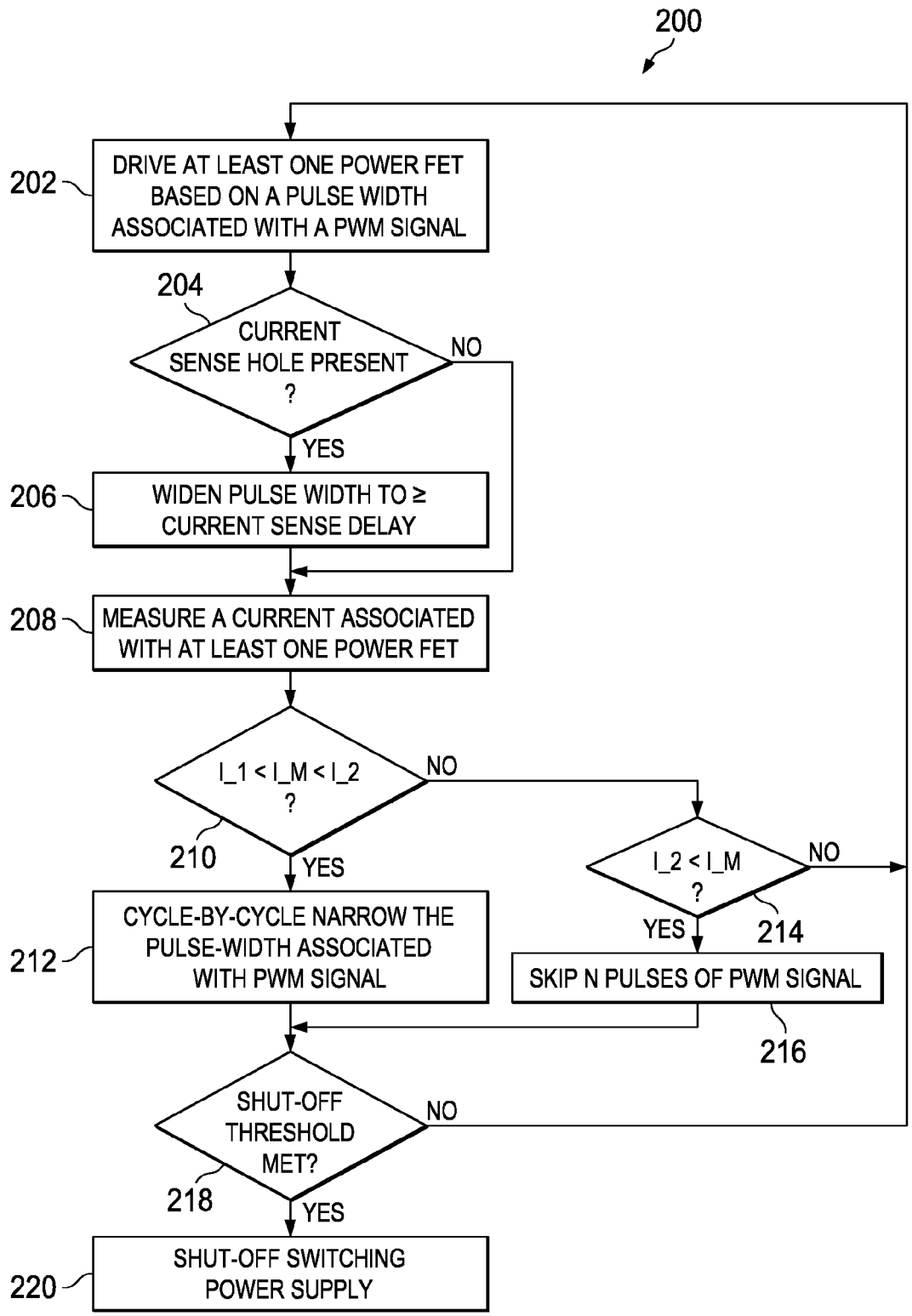
FIG. 5 illustrates a method for providing over-current protection for a switching power supply in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates a method 200 for providing over-current protection for a switching power supply in accordance with an aspect of the invention. At 202, at least one power FET is driven in alternating activated and deactivated states based on a pulse-width associated with a PWM signal. The at least one power FET could be part of a half-bridge regulator circuit that alternately couples a switching node between a positive supply voltage and ground, with the switching node being coupled to the switching power supply output via an inductor. At 204, a decision is made as to whether a current sense hole condition is present. A current sense hole could exist if the switching power supply is not operating in a steady state. For example, if a current associated with a second one of the at least one FET exceeding a negative threshold value, and the pulse-width of the PWM signal is narrower than a delay associated with a current sensing circuit that measures a current associated with the at least one power FET, then a current hole condition could exist. If "yes", that a current sense hole condition is present, then the method proceeds to 206. If "no", then the method proceeds to 208. At 206, the pulse-width associated with the PWM signal is widened to substantially equal to or greater than the delay associated with the current sense circuit. The method then proceeds to 208.

At 208, the current associated with the at least one power FET is measured. The measurement could be made by a current sense circuit. The current sense circuit could measure the current via a comparator or a current sense resistor. At 210, a decision is made as to whether the measured current ("μM") is between a first predetermined over-current threshold ("I_1") and a second predetermined over-current threshold ("I_2"). The first predetermined over-current threshold could be an overload condition. The second predetermined over-current threshold could be a short-circuit condition of the output of the switching power supply and could be greater than the first predetermined over-current threshold condition. If "yes", then the method proceeds to 212. If "no", the method proceeds to 214. At 212, the pulse-width associated with the PWM signal is narrowed on a cycle-by-cycle basis to reduce the current of the switching power supply. The method then proceeds to 218.

At 214, a decision is made as to whether the measured current ("μM") is greater than a second predetermined over-current threshold ("I_2"). If "yes", then the method proceeds to 216. If "no", the method proceeds back to 202. At 216, N pulses of the PWM signal are skipped, where N is an integer greater than or equal to 1. The number of skipped pulses could be preprogrammed. The skipped pulses could allow an inductor to discharge current rapidly from the switching power supply. The method then proceeds to 218. At 218, a shut-off threshold is determined if met. The shut-off threshold condition could be a counted number of periods of the PWM signal that the over-current condition is present, or it could be a predetermined time that the over-current condition is present. If "yes", the method proceeds to 220. At 220, the switching power supply is shut-off. If "no", the method proceeds back to 202.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A switching power supply comprising:
    a gate drive circuit operative to receive a pulse-width modulated (PWM) signal and to drive at least one power field effect transistor (FET) between alternating activated and deactivated states based on a pulse-width of the PWM signal;
    a current sense circuit operative to measure a current associated with the at least one power FET during the activated state;
    a first over-current protection circuit providing a first adjustment to the PWM signal by providing a cycle-by-cycle pulse-width narrowing of the PWM signal in response to a measured current being substantially between a first threshold and a second threshold, the second threshold being greater than the first threshold; and
    a second over-current protection circuit providing a second adjustment to the PWM signal in response to the measured current being substantially greater than the second threshold.

2. The switching power supply of claim 1, wherein the first over-current protection circuit is further operative to deactivate the switching power supply upon providing the first adjustment to the PWM signal for one of a predetermined period of time and a predetermined number of pulses of the PWM signal.

3. A switching power supply comprising:
    a gate drive circuit operative to receive a pulse-width modulated (PWM) signal and to drive at least one power field effect transistor (FET) between alternating activated and deactivated states based on a pulse-width of the PWM signal;
    a current sense circuit operative to measure a current associated with the at least one power FET during the activated state;
    a first over-current protection circuit providing a first adjustment to the PWM signal in response to a measured current being substantially between a first threshold and a second threshold, the second threshold being greater than the first threshold; and
    a second over-current protection circuit providing a second adjustment to the PWM signal by skipping N pulses of the PWM signal, where N is a positive integer greater than or equal to 1 in response to the measured current being substantially greater than the second threshold.

4. The switching power supply of claim 3, wherein the second over-current protection circuit is further operative to deactivate the switching power supply upon one of skipping a predetermined number of pulses of the PWM signal and skipping pulses of the PWM signal for a predetermined period of time.

5. The switching power supply of claim 1, wherein the over-current protection circuit comprises a current sense hole detector operative to detect a condition in which the current sense circuit is unable to measure the current associated with the at least one power FET resulting from a pulse-width of the PWM signal being be less than a sensing delay associated with the current sense circuit.

6. The switching power supply of claim 5, wherein the current sense hole detector provides an output to a pulse widener, the pulse widener being operative to widen the pulse-width of the PWM signal to substantially greater than or equal to the sensing delay associated with the current sense circuit.

7. The switching power supply of claim 5, wherein the current sense hole detector detects the condition by detecting that a current associated with a second one of the at least one power FET exceeds a negative threshold relative to a steady-state of operation and by detecting that the pulse-width of the PWM signal is substantially less than a sensing delay associated with the current sense circuit.

8. A class-D amplifier comprising the switching power supply of claim 1.

9. A method for providing over-current protection in a switching power supply, the method comprising:
   driving at least one power field effect transistor (FET) in alternating activated and deactivated states based on a pulse-width associated with a pulse-width modulated (PWM) signal;
   measuring a current associated with the at least one power FET;
   detecting if the measured current satisfies an over-current condition based on a first threshold and a second threshold, the second threshold being greater than the first threshold;
   narrowing the pulse-width associated with the PWM signal on a cycle-by-cycle basis if the measured current is substantially between the first threshold and the second threshold; and
   skipping N pulses of the PWM signal if the measured current is greater than the second threshold, where N is a positive integer greater than or equal to 1.

10. The method of claim 9, further comprising determining the presence of a current sense hole associated with measuring the current, the current sense hole being a condition upon which the pulse-width associated with the PWM signal is insufficient for measuring the current associated with the at least one power FET.

11. The method of claim 10, wherein determining the presence of the current sense hole comprises detecting a negative threshold value of a current associated with a second one of the at least one power FET relative to a steady state and determining whether the pulse-width associated with the PWM is narrower than a delay associated with measuring the current.

12. The method of claim 10, further comprising widening the pulse-width associated with the PWM signal to substantially greater than or equal to a delay associated with measuring the current in response to determining the presence of the current sense hole associated with measuring the current.

13. The method of claim 9, further comprising shutting-off the switching power supply in response to a threshold condition associated with at least one of narrowing the pulse-width associated with the PWM signal and skipping the N pulses of the PWM signal.

14. The method of claim 13, further comprising incrementing a counter for each period of the PWM signal while the measured current satisfies the over-current condition, such that the threshold condition comprises a predetermined number of periods.

15. The method of claim 13, further comprising incrementing a timer while the measured current satisfies the over-current condition, such that the threshold condition comprises a predetermined time.

16. A switching power supply comprising:
   means for providing a pulse-width modulated (PWM) signal to drive at least one power field effect transistor (FET) between alternating activated and deactivated states based on a pulse-width associated with the PWM signal;
   means for determining the presence of a current sense hole associated with a current, the current being associated with the at least one power FET in the activated state;
   means for adjusting the PWM signal to allow the current associated with the at least one power FET to be measured;
   means for measuring the current associated with the at least one power FET in the activated state;
   means for detecting an over-current condition based on the measured current being greater than a current threshold; and
   means for reducing a current associated with the switching power supply in response to the over-current condition.

17. The switching power supply of claim 16, wherein the means for reducing the current comprises a first means for reducing the current and a second means for reducing the current, the first means for reducing the current comprising means for reducing the pulse-width associated with the PWM signal on a cycle-by-cycle basis if the measured current is substantially between a first over-current threshold and a second over-current threshold, the second over-current threshold being greater than the first over-current threshold, and the second means for reducing the current comprising means for skipping at least one pulse associated with the PWM signal if the current is greater than the second over-current threshold.

18. The switching power supply of claim 16, further comprising means for shutting-off the switching power supply based on detecting the over-current condition for one of a predetermined number of periods of the PWM signal and a predetermined time.

19. The switching power supply of claim 16, wherein the means for adjusting the PWM signal comprises means for widening the pulse-width associated with the PWM signal to be greater than or equal to a delay associated with the means for measuring the current.

20. The switching power supply of claim 16, wherein the means for determining the presence of a current sense hole comprises means for detecting if a current associated with a second one of the at least one power FET exceeds a negative threshold relative to a steady-state of operation and by detecting that the pulse-width of the PWM signal is substantially less than a sensing delay associated with the means for measuring the current.

\* \* \* \* \*

UNITED STATES PATENT AND TRADEMARK OFFICE
CERTIFICATE OF CORRECTION

PATENT NO.       : 7,595,615 B2                                          Page 1 of 1
APPLICATION NO.  : 11/396859
DATED            : September 29, 2009
INVENTOR(S)      : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Twenty-eighth Day of September, 2010

David J. Kappos
*Director of the United States Patent and Trademark Office*